(12) United States Patent
Hoda et al.

(10) Patent No.: US 6,225,715 B1
(45) Date of Patent: *May 1, 2001

(54) CONSTRUCTION OF A MOTOR WITH A BUILT-IN SENSOR

(75) Inventors: Akihiko Hoda; Toshihiro Iwamatsu, both of Kashiwa (JP)

(73) Assignee: Oriental Motor Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/343,108

(22) Filed: Jun. 29, 1999

(51) Int. Cl.$^7$ .............................. H02K 7/00; H02K 11/00; H02K 5/00; H02K 5/16
(52) U.S. Cl. ...................... 310/67 R; 310/68 B; 310/89; 310/90
(58) Field of Search .............................. 310/67 R, 68 B, 310/89, 88, 90, 91, 68 E, 66

(56) References Cited

U.S. PATENT DOCUMENTS

| | | | |
|---|---|---|---|
| 3,790,832 | * | 2/1974 | Patel ...................... 310/113 |
| 3,873,861 | * | 3/1975 | Halm ...................... 310/43 |
| 4,110,676 | * | 8/1978 | Edick et al. ............ 322/31 |
| 4,429,242 | * | 1/1984 | Layh ...................... 310/71 |
| 4,772,815 | | 9/1988 | Harned et al. .......... 310/171 |
| 4,910,790 | * | 3/1990 | Kershaw ................. 388/836 |
| 4,952,830 | * | 8/1990 | Sirakawa ................ 310/68 B |
| 4,955,128 | * | 9/1990 | Sogabe et al. .......... 29/596 |
| 5,369,322 | * | 11/1994 | Maruyama et al. ..... 310/39 |
| 5,434,463 | * | 7/1995 | Horski ................... 310/248 |
| 5,614,775 | * | 3/1997 | Horski et al. .......... 310/68 R |
| 5,617,241 | * | 4/1997 | Kitazawa ............... 359/200 |
| 5,780,946 | * | 7/1998 | Nakamura et al. ..... 310/58 |
| 5,786,646 | * | 7/1998 | Newberg et al. ....... 310/68 B |
| 5,864,182 | * | 1/1999 | Nagate et al. .......... 310/156 |
| 5,955,807 | * | 9/1999 | Kajiura et al. ......... 310/156 |
| 5,977,671 | * | 11/1999 | Kim ....................... 310/89 |

FOREIGN PATENT DOCUMENTS 8-168210   6/1996 (JP).

OTHER PUBLICATIONS

Merriam Webster's Collegiate Dictionary, tenth edition, p. 150, 1997.*

* cited by examiner

Primary Examiner—Nestor Ramirez
Assistant Examiner—Dang Dinh Le
(74) Attorney, Agent, or Firm—Anderson, Kill & Olick P.C.

(57) ABSTRACT

An object of the present invention is to provide a construction of a motor with a built-in sensor, in which the total length of the motor is not increased, and can be made approximately equal to the total length of the conventional motor which has no built-in sensor. To achieve this object, in a motor 1 comprising a rotor 3 having rotor cores 6a and 6b and a stator 2 in which windings 5 are wound on a stator core 4 to form a rotational magnetic field, a substantially cylindrical recess 21 with a diameter smaller than the outside diameter of the rotor 3 is formed at the end face portion of the rotor core 6a, 6b, and in a space 22 which communicates with the recess 21, including the recess 21, and reaches the end face of the windings 5 of the stator 2, a part of a motor frame 11 to which a bearing 9 for rotatably supporting a rotor shaft 7 while passing through it is fitted and a sensor 23, on the outside of the bearing 9, for detecting the position or speed of the motor 1 are disposed.

4 Claims, 2 Drawing Sheets

CONSTRUCTION OF A MOTOR WITH A BUILT-IN SENSOR

FIELD OF THE INVENTION AND RELATED ART STATEMENT

The present invention relates to a construction of a motor which a sensor for detecting position or speed thereof is built in. More particularly, it relates to a construction of a hybrid type stepping motor, a VR type stepping motor, and a DC brushless motor, for example, which the aforesaid sensor is built in, or a motor in which a sensor is made function as a resolver.

As a construction of a motor with a built-in sensor of this type relating to the present invention, regarding a motor which a sensor such as a variable magnetic resistance resolver is built in, there is disclosed a motor in which a motor portion and a sensor portion for detecting position or speed of the motor are arranged in line in the axial direction, and are contained in one housing with their rotating shafts are made in common (Japanese Patent Provisional Publication No. 1-164298(No. 164298/1989): same as U.S. Patent application No. 096522 filed on Sep. 15, 1987).

When a sensor for detecting position and speed, such as a general encoder or resolver, is built in a motor, a motor construction as shown in FIG. 2 has been used.

In FIG. 2, a motor 101 is made up of a stator 102 and a rotor 103 rotatably disposed on the axis of the stator 102. The stator 102 has windings 105 wound on a stator core 104 to form a rotating magnetic field. The rotor 103, consisting of a rotor core 106 and a rotor shaft 107, is rotatably supported on frames 109, 109 via bearings 108, 108.

General methods for detecting the position of motor rotor includes a method, being used for a DC motor etc., in which a magnetic flux of a permanent magnet fixed to the rotor is detected by a magnetic sensor such as a Hall effect element, and a method, being seen in a servomotor etc., in which a position sensor 110 such as an optical encoder etc. is disposed on the opposite side of the output shaft side of the motor (for example, Japanese Patent Provisional Publication No. 8-168210 (No. 168210/1996).

However, a construction of such a conventional motor, for example, a construction of a motor which a sensor such as a variable magnetic resistance type resolver or an optical encoder is built in has a problem in that the size of the whole motor is lengthened because the size of the aforesaid encoder portion serving as a sensor is added.

In this case, if an attempt is made to keep the total length of motor the same size as that of the conventional motor, the total length of the rotor is inevitably shortened, which causes the output to decrease as compared with the motor of the same size.

On the other hand, for the motor disclosed in aforesaid Japanese Patent Provisional Publication No. 1-164298(No. 164298/1989), the motor portion and the sensor portion have the same outside diameter, so that this motor has an advantage of the common use of iron plate for forming the core. However, the sensor portion is subject to the effect of magnetic flux generated on the motor portion, so that some degree of distance is needed between the motor portion and the sensor portion. Therefore, this motor has a problem in that the total length of motor is increased.

OBJECT AND SUMMARY OF THE INVENTION

The present invention has been made to solve the above problems, and accordingly an object thereof is to provide a construction of a motor with a built-in sensor, in which the total length of the motor is not increased, and can be made approximately equal to the total length of the conventional motor which has no built-in sensor.

To achieve the above object, in a motor comprising a rotor having a rotor core and a stator in which windings are wound on a stator core to form a rotational magnetic field, (1) A substantially cylindrical recess with a diameter smaller than the outside diameter of the rotor is formed at the end face portion of the rotor core, and in a space which communicates with the recess, including the recess, and reaches the windings end face of the stator, a part of a motor frame to which a bearing for rotatably supporting a rotor shaft while passing through it is fitted and a sensor, on the outside of the bearing, for detecting the position or speed of the motor are disposed.

(2) In item (1), the sensor consists of a fixed portion and a movable portion, the fixed portion and the bearing are disposed on one frame of the motor, and the movable portion is fixed to the rotor shaft so as to operate in cooperation with the fixed portion.

(3) In items (1) and (2), a step portion having an outer peripheral surface parallel and concentric with the axis of the bearing is formed on the inside of motor frames disposed at both ends of the stator core, and the rotor is positioned by fitting the motor frames to the inner peripheral surface of the stator core via the each step portion.

In the construction of a motor with a built-in sensor configured as described above, the inside of the rotor core, which faces the end portion and does not contribute to the development of torque of the motor, is cut out, and a part of the motor frame to which the bearing for the rotor shaft is fitted is disposed in this cut-out recess, and also the sensor is disposed in the space reaching the winding end face of stator on the outside of the bearing. By housing the bearing and the sensor in the recess and the space, the motor construction is made thin.

According to the construction of the present invention, the total length of the motor is not increased, and can be made approximately equal to the total length of the conventional motor which has no built-in sensor. Therefore, the motor portion can be made thin, and at the same time, the output and characteristics that the motor inherently has are not decreased as compared with the motor of the same size.

Thereupon, the total length of the motor can be shortened as compared with the conventional motor for controlling position or speed. Also, since the inertia of the rotor can be decreased, the acceleration and deceleration characteristics of the motor can be increased.

Further, the gap portion between the fixed portion and the movable portion of sensor, which detects the magnetic resistance, separates from the gap between the stator and the rotor of the motor, where the magnetic flux density is high, toward the inner periphery where the magnetic flux density is low, so that the distance between the rotor of the motor and the sensor can be decreased.

At the same time, since the bearing is interposed between the rotor of the motor and the sensor, a certain shield effect can be anticipated.

Further, since the fixed portion of the sensor is assembled to the motor frame, the construction of the motor is simple, which permits easy assembly. At the same time, since the motor frame is assembled while being fitted on the inner peripheral surface of the stator core, the rotor can be positioned easily.

DETAILED DESCRIPTION OF A PREFERRED EMBODIMENT

A preferred embodiment of the present invention will be described in detail with reference to the accompanying drawings.

Figure 1:
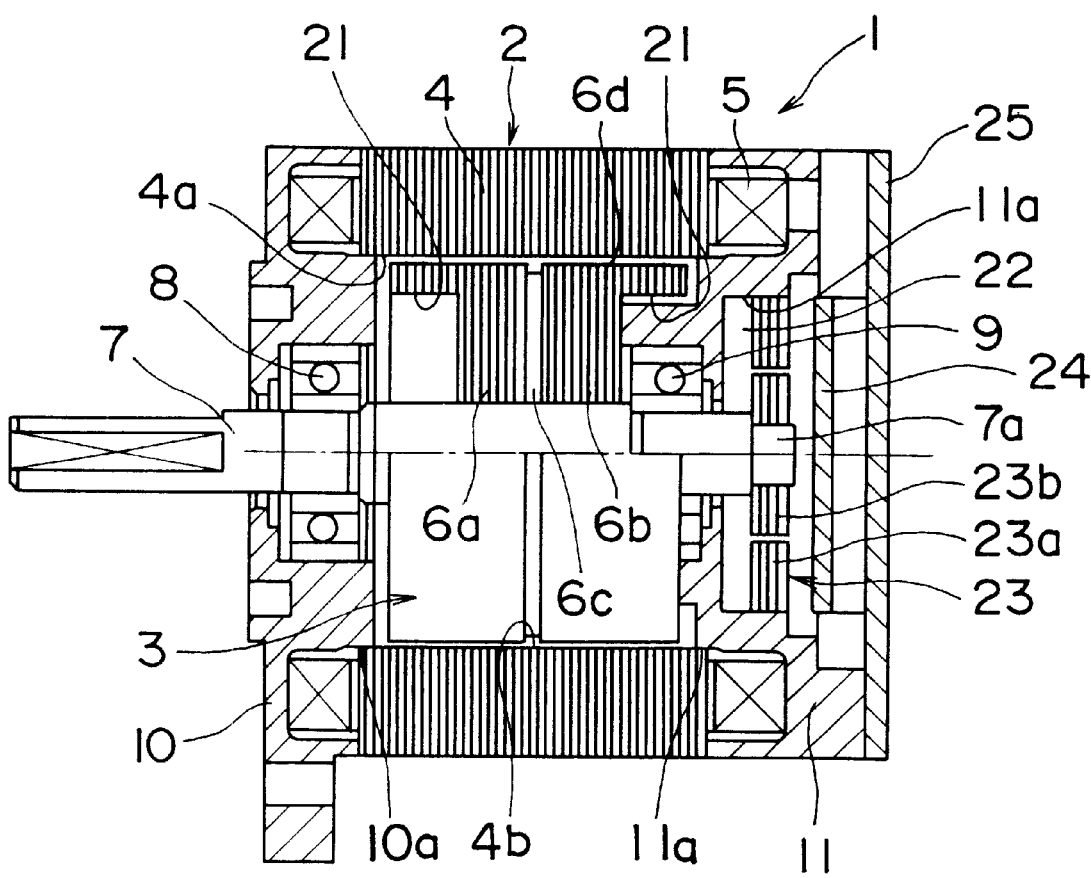
FIG. 1 is an explanatory view for illustrating a construction of a two-phase hybrid type stepping motor showing one embodiment of a construction of a motor with a built-in sensor in accordance with the present invention, the figure being a longitudinal sectional view in which only a rotor is shown in cross section for ease of understanding of the construction of the rotor.
Figure 2:
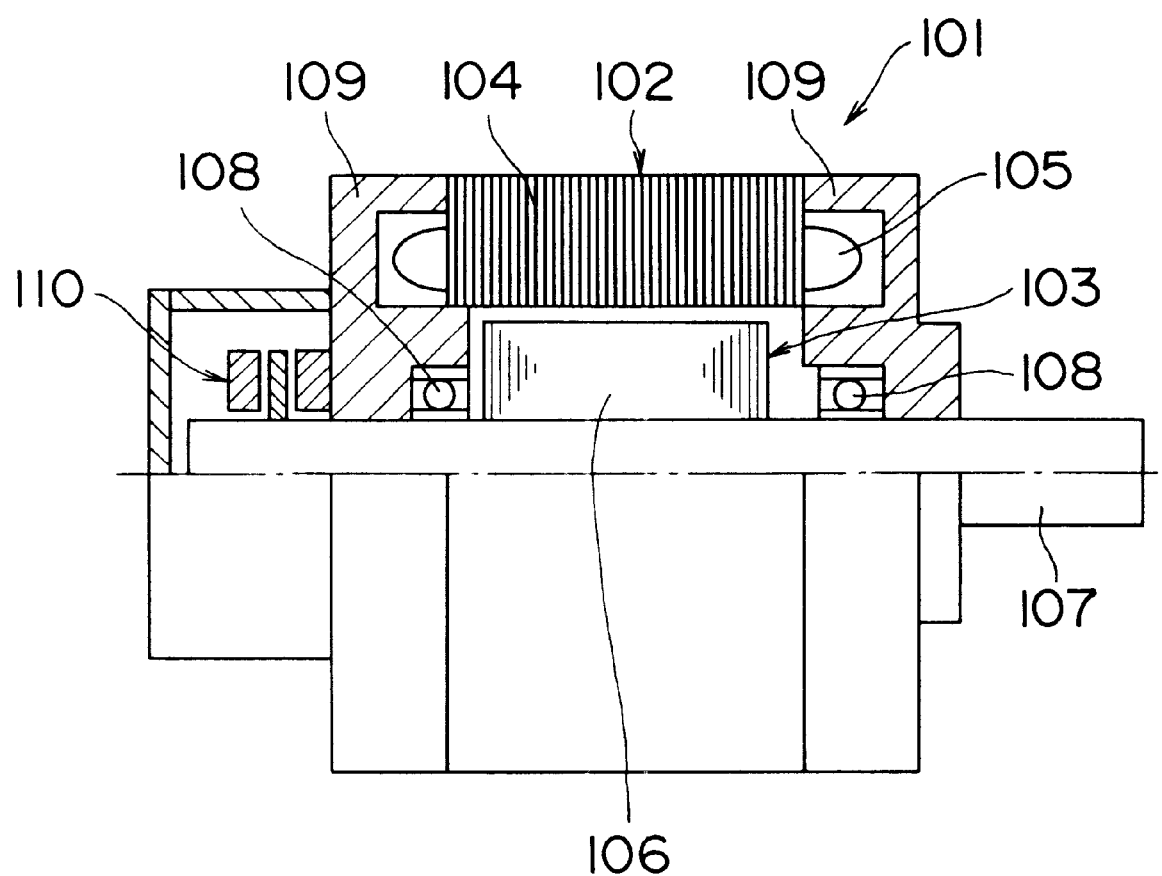
FIG. 2 is a longitudinal sectional view showing a construction of a motor with a built-in sensor relating to the present invention.

FIG. 1 is an explanatory view for illustrating a construction of a two-phase hybrid type stepping motor showing one embodiment of a construction of a motor with a built-in sensor in accordance with the present invention, the figure being a longitudinal sectional view in which only a rotor is shown in cross section for ease of understanding of the construction of the rotor.

In FIG. 1, the stepping motor 1 is made up of a stator 2 and a rotor 3 rotatably disposed on the axis of the stator 2.

For the stator 2, a stator core 4 has a plurality of magnetic poles arranged radially toward the inside, and a plurality of stator pole teeth 4a are formed at equal intervals in the circumferential direction on the inner peripheral surface of each magnetic pole. The stator 2 has a winding 5 wound on each of the magnetic pole of the stator core 4 to form a rotating magnetic field, and is fastened and supported on motor frames 10 and 11, each of which surrounds the winding 5 and fits to an inner peripheral surface 4b of the stator core 4, by using screws (not shown) or the like.

The rotor 3 is, together with rotor cores 6a and 6b and a shaft 7, rotatably supported on the frames 10 and 11 via bearings 8 and 9 while the shaft 7 passes through the rotor 3.

In the stator 2, the motor frames 10 and 11 are formed with step portions 10a and 11a each having an outer peripheral surface parallel and concentric with the axis of the bearings 8 and 9 on the inside thereof, respectively, disposed at both ends of the stator core 4. Then, the motor frames 10 and 11 each are assembled via the step portions 10a and 11a while being fitted to the inner peripheral surface of the stator core 4, by which the position of the rotor 3 is determined in the stator 2.

The rotor 3 is provided, on the shaft 7, with the aforesaid two rotor cores 6a and 6b and a ring-shaped permanent magnet 6c which is held between the rotor cores 6a and 6b and magnetized axially. Also, a plurality of rotor pole teeth 6d are formed at equal intervals in the circumferential direction on the outer peripheral surfaces of the rotor cores 6a and 6b so as to face the stator pole teeth 4a.

A cylindrical recess 21 parallel with the shaft 7 is formed at the end face portion of each of the rotor cores 6a and 6b of the rotor 3, which recess has a diameter smaller than the outer diameter of the rotor 3 and a length which scarcely affects the development of torque of the rotor 3.

The magnetic fluxes scarcely go through the recess 21 formed at the end face portion of each of the rotor cores 6a and 6b, so that the produced torque of the motor is scarcely affected by the recess 21.

The rotor core 6a, 6b is formed by laminating two types of iron plates: iron plates whose inner periphery is cut out to form the recess 21 and iron plates which are not cut out. The ring-shaped permanent magnet 6c held between the rotor cores 6a and 6b uses a neodymium-boron permanent magnet with a high energy product so that a satisfactory magnetic flux density can be obtained even if the thickness is small.

The frame 11 is formed slightly into a cone-shape with steps so that the central portion of the frame 11, to which the bearing 9 is fitted, is positioned within the recess 21 formed in one rotor core 6b of the rotor cores 6a and 6b, that is, the rotor core 6b on the side such that the shaft 7 does not project outward as an output shaft.

In a space 22 formed in a step portion 11a of the stepped cone-shaped frame 11, a sensor 23 for detecting the position or rotational speed of the rotor 3 is disposed on the outside of the bearing 9. The space 22 formed here is defined on the outside of the bearing 9 so as to reach just the portion corresponding to the end face of the winding 5 of the stator 2.

The sensor 23, which is a variable magnetic resistance type resolver, consists of a fixed portion 23a and a movable portion 23b, which are analogous to the stepping motor. The fixed portion 23a is fitted in the step portion 11a of the stepped cone-shaped frame 11. The movable portion 23b is fixed to an end portion 7a of the shaft 7 so as to interact with the fixed portion 23a with no contact, and is provided with a printed circuit board 24 on which an electronic circuit connected to the sensor 23 is formed. Reference numeral 25 denotes an end cover for the motor 1.

The operation of the sensor 23 is as follows: A winding for detecting position is wound on the core of the fixed portion 23a. The inductance of the winding is changed by the positional relationship between the fixed portion 23a and the movable portion 23b, by which the position of the movable portion 23b, that is, the rotor shaft 7 is detected.

This embodiment can be modified as follows:

(1) Regarding the construction of the motor, the motor can have a construction such that the sensor is replaced with the bearing.

(2) Regarding the motor, this construction can be applied to a stepping motor of double stack and triple stack, and moreover can be applied to a motor other than the stepping motor.

(3) As the sensor, a small sensor other than the variable magnetic resistance type resolver, for example, an optical encoder can be used.

The art of the present invention is not limited to the art in this embodiment, and it may be realized by means of another mode which performs the similar function. Also, the art of the present invention can be modified or added variously within the scope of the above-described configuration.

As is apparent from the above description, according to the construction of the motor with a built-in sensor in accordance with the present invention, the substantially cylindrical recess with a diameter smaller than the outside diameter of the rotor is formed at the end face portion of the rotor core, and in the space which communicates with the recess, including the recess, and reaches the winding end face of the stator, a part of the motor frame to which the bearing for rotatably supporting the rotor shaft while passing through it and the sensor, on the outside of the bearing, for detecting the position or speed of the motor are disposed, so that the total length of the motor is not increased, and can be made approximately equal to the total length of the conventional motor which has no built-in sensor. Therefore, the motor portion can be made thin, and at the same time, the output and characteristics that the motor inherently has are not decreased as compared with the motor of the same size.

Thereupon, the total length of the motor can be shortened as compared with the conventional motor for controlling position or speed. Also, since the inertia of the rotor can be decreased, the acceleration and deceleration characteristics of the motor can be increased.

Further, since the fixed portion of the sensor is assembled to the motor frame, the construction of the motor is simple, which permits easy assembly.

What is claimed is:

1. A motor having an internally built-in sensor for detecting the position or speed of the motor with, said motor being mounted in a motor frame and comprising a rotor having a rotor core, a rotor shaft and a stator having a stator core; windings wound on said stator core to form a rotational magnetic field, said rotor core having a substantially cylindrical recess provided therein with a diameter smaller than the outside diameter of said rotor, said motor frame having a portion extending into said cylindrical recess; and a bearing for rotatably supporting said rotor shaft, said bearing being mounted on said portion of said motor frame; wherein said sensor is located adjacent to said bearing within said motor for detecting the position or speed of said motor with said sensor including a fixed member and a movable member and having a trap separating said movable member from said fixed member.

2. A motor with a built-in sensor according to claim 1, wherein said fixed member and said bearing are mounted on said frame of said motor, and said movable member is mounted on said rotor shaft so as to operate in cooperation with said fixed member.

3. A motor with a built-in sensor according to claim 2, wherein said portion of said motor frame extending into said cylindrical recess is a step portion having an outer peripheral surface concentric with the axis of said bearing which lies on the inside of each of the motor frames at both ends of said stator core.

4. A motor with a built-in sensor according to claim 1, wherein said portion of said motor frame extending into said cylindrical recess is a step portion having an outer peripheral surface concentric with the axis of said bearing which lies on the inside of each of the motor frames at both ends of said stator core.

* * * * *